United States Patent [19]
Boswell

[11] 3,823,316
[45] July 9, 1974

[54] IONIZING RADIATION APPARATUS AND METHOD FOR ANALYZING FLOWING SUBSTANCES

[75] Inventor: Colin Ralph Boswell, North Island, New Zealand

[73] Assignee: United Kingdom Atomic Energy Authority, London, England

[22] Filed: Aug. 3, 1971

[21] Appl. No.: 168,607

[30] Foreign Application Priority Data
Aug. 10, 1970 Great Britain.................... 38512/70

[52] U.S. Cl.............................250/375, 250/393
[51] Int. Cl...........................................G01n 23/12
[58] Field of Search...............250/43.5 D, 43.5 FC, 250/43.5 MR, 106 S, 106 T

[56] References Cited
UNITED STATES PATENTS

| | | | |
|---|---|---|---|
| 2,841,713 | 7/1958 | Howard | 250/43.5 FC |
| 2,906,680 | 9/1959 | Ruskin | 250/106 S X |
| 2,958,777 | 11/1960 | Sieswerda et al. | 250/43.5 D X |
| 2,961,541 | 11/1960 | Ruderman | 250/43.5 MR X |
| 3,115,576 | 12/1963 | Rickard | 250/43.5 FC |
| 3,655,964 | 4/1972 | Slight | 250/43.5 D |

Primary Examiner—Archie R. Borchelt
Attorney, Agent, or Firm—Larson, Taylor & Hinds

[57] ABSTRACT

Methods and apparatus are disclosed for analyzing a flowing sample to detect one substance therein having a predetermined half-life, or two (or more) substances having respectively different half-lives. The sample flows past a first location, where it is irradiated with neutrons, and then through a single detecting location or two or more serially arranged detecting locations (according to the number of substances to be detected) where the radiation is detected for subsequent analysis of its spectrum. When detecting one substance, it is proposed to select a flow rate in relation to the particular delay volumes in the system such that the radiation activity is a maximum at which value it is little dependent on small changes in the flow rate. This flow rate would be different for each of two substances to be detected, and, in such a case, it is proposed to use a very high flow rate such that the dependence of the activity of flow rate changes is again small. As an alternative, it is proposed that the respective delay volumes in the system between the irradiating location and each of the two detecting locations be so selected in relation to the respective half-lives of the two substances to be detected that there is a single flow rate which gives maximum activity at both of the two detecting locations.

5 Claims, 6 Drawing Figures

3,823,316

IONIZING RADIATION APPARATUS AND METHOD FOR ANALYZING FLOWING SUBSTANCES

BACKGROUND OF THE INVENTION

The invention relates to the analysis of flowable samples, and, more particularly, to the on-line activation analysis of flowable samples.

Methods of activation analysis are known in which a sample to be analysed, so as to detect one or more substances therein having known half-lives, is irradiated with neutrons, and the radiation activity of the sample is subsequently measured at different energy levels. In known manner, the shape of the spectrum produced is dependent on the half-lives of the substances in the sample and enables the presence of the substances to be detected.

However, problems arise if the sample is not static but is flowing (such as in the form of a fluid, a fluidised powder or solid particles, for example). In such a case, the amount of neutron radiation received by each part of the sample depends on the flow rate, and the subsequent measurement of the radiation activity by the sample is also dependent on the flow rate. It can be shown that slight changes in the flow rate can have a considerable effect on the measured activity, and furthermore the effect is different for different substances to be detected. Unless precautions are taken, therefore, the results obtained by activation analysis of a flowing sample may be misleading or inaccurate.

It is therefore an object of the invention to provide an improved method and apparatus for on-line activation analysis of a flowing substance.

It is a further object of the invention to provide improved methods and apparatus for on-line activation analysis of a flowing substance, in which sensitivity to changes in flow rate is reduced.

BRIEF SUMMARY OF THE INVENTION

According to the invention, there is provided a method of on-line analysis of a flowing sample to detect at least one substance therein, in which the flowing sample is irradiated at a first location in its flow path, and in which the radiation produced is detected at a second location in the flow path, downstream of the first location, and characterised in that the flow rate of the sample along the flow path is so selected, in relation to the relative volumes of the sample in the part of the flow path between the first and second locations, that the radiation activity for the said substance is a maximum at the second location.

According to the invention, there is also provided a method of on-line analysis of a flowing sample to detect at least two substances therein having different half-lives, comprising the steps of irradiating the sample with neutrons at a first location in a flow path, and detecting the radiation emitted by the sample at second and third locations in the flow path one of which two locations is downstream of the other and both of which are downstream of the first location; and in which the respective volumes of the sample in the part of the flow path between the first location and the second location and in the part of the flow path between the first location and the third location are so related to the respective half-lives of the two substances that, when the flow rate of the sample along the flow path is such that the radiation activity for the first substance is a maximum at the second location, the radiation activity for the second substance is a maximum at the third location.

According to the invention, there is further provided a method of on-line analysis of a flowing sample to detect at least two substances therein having respectively different half-lives, in which the flowing sample is irradiated with neutrons at a first location in its flow path, and in which the radiation from the sample is detected at a second location in the flow path, downstream of the first location, characterised in that the flow rate of the sample along the flow path is sufficiently high for the radiation activity produced by each substance to be substantially independent of the flow rate.

According to the invention, there is still further provided apparatus as hereinafter defined for carrying out said methods.

BRIEF DESCRIPTION OF THE DRAWINGS

On-line activation analysis systems and methods according to the invention will now be described by way of example only with reference to the accompanying drawings in which.

DESCRIPTION OF PREFERRED EMBODIMENTS

Figure 1:
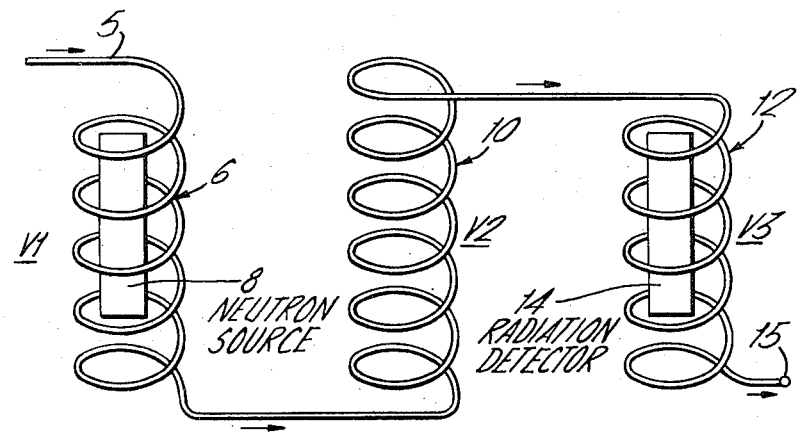
FIG. 1 is a block diagram of one of the systems.

The system of FIG. 1 is for continuously analysing a flowing fluid sample and for detecting the presence therein of one or more substances, such as copper and phosphorus. The fluid sample to be analysed is fed continuously through the system by means of a pipe 5. The pipe 5 has a first coiled region 6 where it is coiled about a neutron generator 8 which irradiates the fluid with neutrons. The volume of the pipe in the coil 6 is V1. From the coil 6, the pipe 5 carries the irradiated fluid to a second coiled region 10, the total volume of the pipe within this region being V2. From the region 10, the pipe carries the fluid to a third coiled region 12, the total pipe volume in the coiled region 12 being V3. Mounted within the coil 12 is a radiation detector 14.

From the coil 14, the pipe 5 passes to an outlet 15.

In operation, the fluid sample to be analysed is pumped through the pipe 5 by means of a pump not shown. As the fluid passes through the coil 6, it is irradiated by the neutrons produced by the neutron generator 8. As the irradiated fluid passes through the coil 12, the detector 14 measures the radiation emitted by the fluid sample at different energy levels. In the known manner, the shape of the spectrum produced is dependent on the half-lives of the substances in the fluid and enables the presence of phosphorus and/or copper in the sample to be detected.

Figure 2:
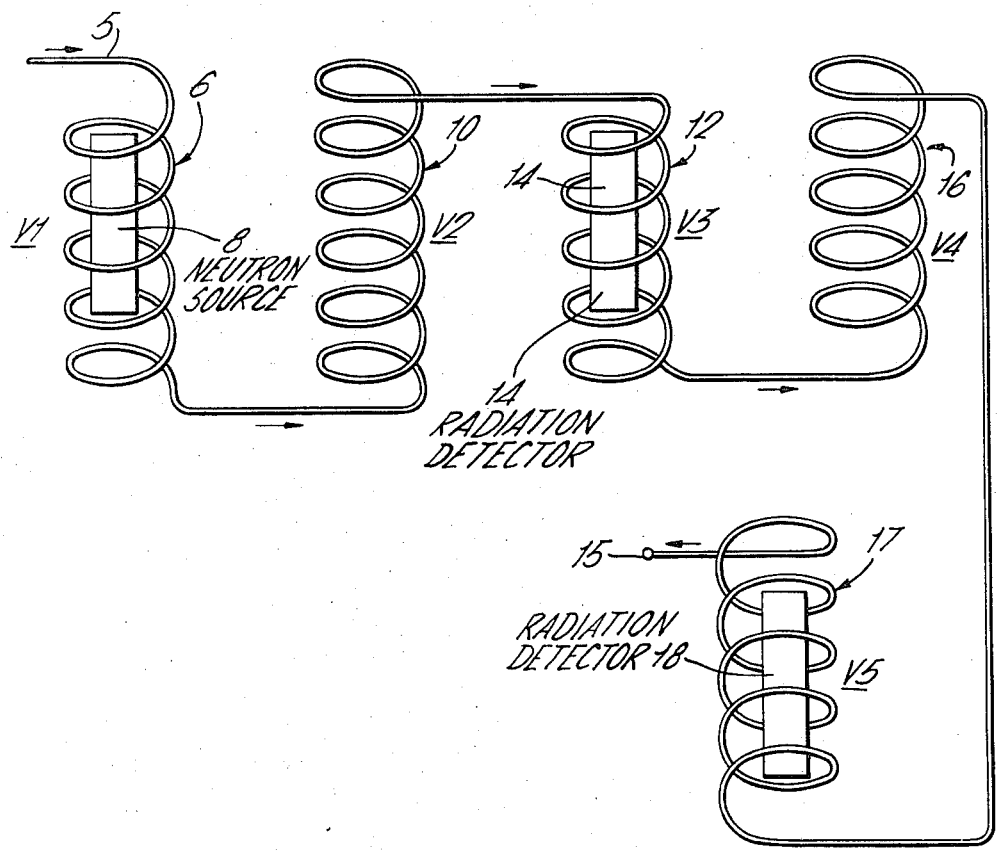
FIG. 2 is a block diagram of another of the systems.

In FIG. 2, items corresponding to items in FIG. 1 are similarly referenced. The system of FIG. 2 is for detecting the presence of two substances, copper and phosphorus, in the flowing sample. It will be seen that the system of FIG. 2 has a fourth coiled region 16 after the coil 14, the volume of the pipe 5 in the coil 16 being V4. Thence, the pipe 5 passes to a fifth coiled region 17, the volume of this coil being V5. Within the coil 17 is mounted a second radiation detector 18.

In operation, the fluid sample to be analysed is pumped through the pipe 5 by means of a pump not shown. As the fluid passes through the coil 6, it is irradiated by the neutrons produced by the neutron generator 8. As the irradiated fluid passes through the coils 12 and 17, the detectors 14 and 18 measure the intensity of the radiation emitted by the fluid at different energy levels. In the known manner the shape of the curve produced by such measurement identifies the substances present in the fluid. In a manner to be explained in detail below, the detector 14 is arranged to have maximum sensitivity for phosphorus while the detector 18 is arranged to have maximum sensitivity for copper.

Initially, the system of FIG. 1 will be considered.

The basic equation for activation analysis of a static sample is $$A = \frac{f \sigma m b \times 6.023 \times 10^{23}}{M} \left(1 - e^{\left[\frac{-0.693 t_i}{t_{1/2}}\right]}\right) \cdot e^{\left[\frac{-0.693 t}{t_{1/2}}\right]} \quad (1)$$

where $A$ is the activity of a substance at a time $t$ after an irradiation of a mass, $m$, in a flux, $f$, of an element with cross-section $\sigma$ and atomic weight $M$, $t_i$ is the irradiation time and $t_{1/2}$ and $b$ are the half-life and branching ratio respectively of the radionuclide produced.

When the sample is a flowing sample, as in the case being considered, Equation 1 no longer holds since the irradiation and counting processes are taking place continuously. Under such conditions, Equation 1 becomes $$A = \frac{f \sigma b \times 6.023 \times 10^{23}}{0.693 M} \left(1 - e^{\left[\frac{-0.693 \cdot V1}{F \cdot t_{1/2}}\right]}\right) \cdot e^{\left[\frac{-0.693 \cdot V2}{F \cdot t_{1/2}}\right]} \cdot \left(1 - e^{\left[\frac{-0.693 \cdot V3}{F \cdot t_{1/2}}\right]}\right) c \cdot F t_{1/2} \quad (2)$$

where $F$ is the flow rate of the sample through the system as a whole, and $c$ is the concentration of the substance to be activated.

By differentiating Equation 2 with respect to $F$ and setting the result equal to zero we get the following equation:

$$F = \frac{0.693 \cdot V1 \cdot e^{\left[\frac{-0.693 \cdot V1}{F \cdot t_{1/2}}\right]}}{t_{1/2}\left(1 - e^{\left[\frac{-0.693 \cdot V1}{F \cdot t_{1/2}}\right]}\right)} + \frac{0.693 \cdot V3 \cdot e^{\left[\frac{-0.693 \cdot V3}{F \cdot t_{1/2}}\right]}}{t_{1/2}\left(1 - e^{\left[\frac{-0.693 \cdot V3}{F \cdot t_{1/2}}\right]}\right)} - \frac{0.693 \cdot V2}{t_{1/2}} \quad (3)$$

This is an implicit equation relating $F$, the flow rate producing maximum activity in the counting cell, with the irradiation, delay, and the counting volumes in such a system. It does not however, lend itself to being solved easily by normal manual methods, although this is possible. It is, therefore, best solved using the techniques of either analogue or digital computation.

Figure 3:
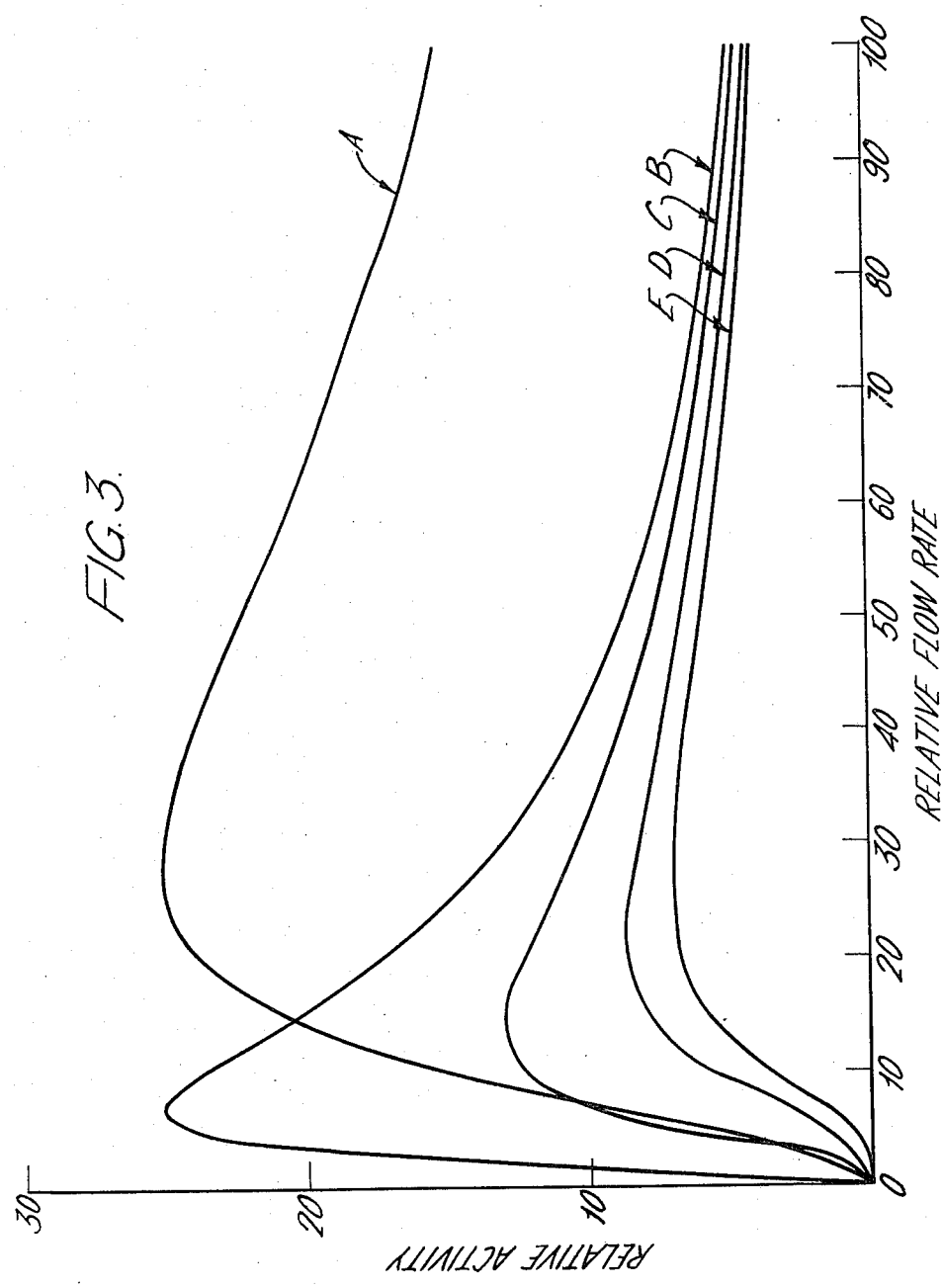
FIGS. 3, 4 and 5 are graphs explaining the operation of the systems of FIGS. 1 and 2.

FIG. 3 shows various curves relating activity $A$ (along the vertical axis) against flow rate $F$ (along the horizontal axis). For each curve, it is assumed that V1 is equal to V3. Curve A is that obtained when the irradiated substance is phosphorus and when V2 = 0.1 V1. The curves B, C, D and E each show the relationship obtained when the irradiated substance is copper but the values of V2 for the four curves are, respectively, 0.1 V1, 1.0 V1, 2.0 V1, and 3.0 V1.

The curves show that, in general, the relative activity varies considerably with flow rate and reaches a maximum from which it falls away as the flow rate increases. The dependence of the activity on the flow rate is, however, relatively small over a small range centred on the flow rate giving maximum activity and is also small at high flow rates. If, therefore, the system of FIG. 1 is required to detect the presence of only one substance, say phosphorus, then, in accordance with one aspect of the invention, the flow rate may be set up, relative to the particular values for V1, V2 and V3, to give maximum activity for that substance at the detector 14. Thus, the system has maximum sensitivity and is only slightly dependent on changes in the flow rate.

Curves A and B show that, for a given system (that is, a given value for the delay value V2), the flow rate giving maximum activity for phosphorus does not give maximum activity for copper. Therefore, if the system of FIG. 1 were required to detect both phosphorus and copper and were set up to use a flow rate providing maximum activity for one of these two substances, the flow rate would not give maximum activity for the other substance and, moreover, would have to be very accurately controlled since any variation would cause large changes in the activity of the other substance. Thus, in accordance with another aspect of the invention, the system of FIG. 1 would, when required to detect both phosphorus and copper, overcome this difficulty by using a very high flow rate since, as shown in FIG. 3, the activity at very high flow rates is, though less than the maximum activity, less dependent on flow rate. However, in many applications, very high flow rates are not satisfactory since, if the fluid being analysed is an aqueous solution, the oxygen present in the water produces high activity at high flow rates and tends to swamp the activities due to copper and phosphorus. Even if oxygen is not present, however, the use of very high flow rates may be unsatisfactory in some applications since the activity is much less than the maximum possible. The system of FIG. 2 overcomes these difficulties as will now be explained.

Figure 4:
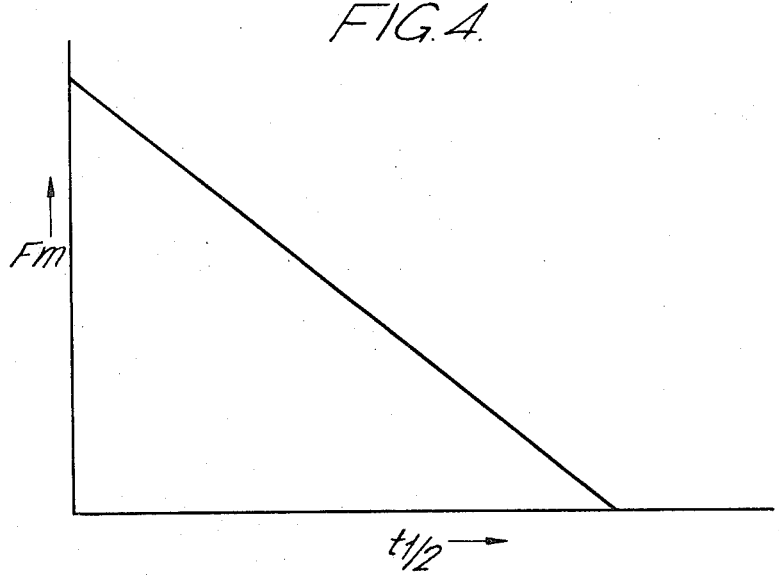

Curves A and B of FIG. 3 show that the value (Fm) of the flow rate producing maximum activity in a given system (that is, for given values of V1, V2 and V3) varies with the half-life of the substance. Computer analysis of Equations 2 and 3 produces FIG. 4 in which Fm is plotted along the vertical axis and values of half-life are plotted along the horizontal axis, for a given system. FIG. 4 shows that $$Fm \cdot (t_1/2) = K_1, \quad (4)$$

where $K_1$ is a constant.

Figure 5:
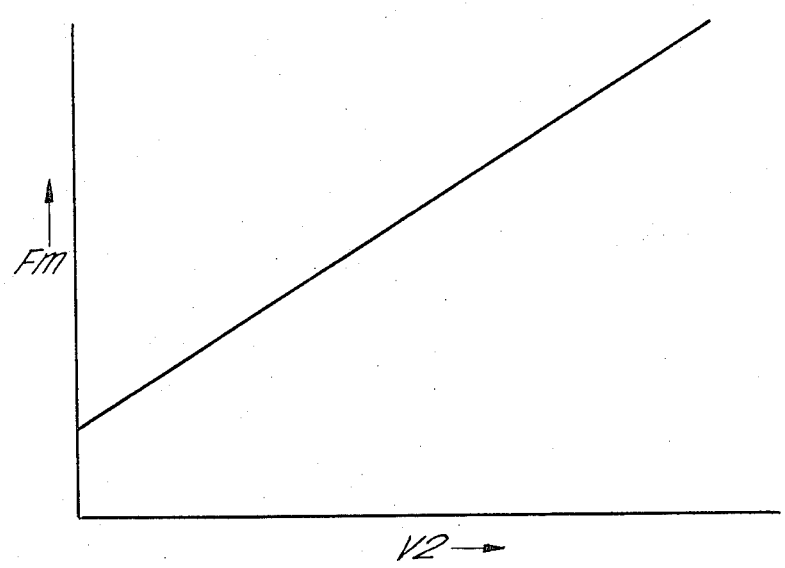

Further computer analysis of equations 2 and 3 produces FIG. 5 in which, for a given value of half-life, Fm is plotted on the vertical axis and V2 is plotted on the horizontal axis. FIG. 5 shows that $$Fm = K_2 \cdot V2 \tag{5}$$

where $K_2$ is another constant.

For the system of FIG. 2 where there are two radiation detectors, Equation 5 is best written as $$Fm = K_2 \cdot Vd \tag{6}$$

where Vd is the delay between the radiation detector and the neutron generator (Vd = V2 for the detector 14 in FIG. 3 and Vd = (V2 + V3 + V4) for the detector 16).

Equations 4 and 6 enable the design of the system of FIG. 2. Thus, for given values of V1, V2 and V3, a flow rate is selected, using a curve of the type shown in FIG. 3, to give maximum activity in the detector 14 for phosphorus. Using Equation 4 and the half-life of phosphorus (2.3 minutes) a value for $K_1$ can now be obtained. Using this value and the half-life (9.76 minutes) of copper, the desired value of Fm for copper can be obtained. Then, using FIG. 5, a corresponding value of Vd can be obtained. If, now, the value of V4 is selected such that (V2 + V3 + V4) is equal to the selected value of Vd, then the flow rate selected to give maximum activity for phosphorus in the detector 14 will also provide maximum activity for copper in the detector 18. Therefore, for this flow rate the system now has maximum sensitivity to both copper and phosphorus activity consistent with minimum dependence on changes in flow rate. In physical terms, it can be said that the delay volume V4 is sufficiently great to allow the activity of the copper to reach a maximum value after passing through the detector 14. It will be appreciated that other values for the delay volumes may enable higher values for the activities to be obtained, but, under these conditions, the dependence on changes in flow rate will be greater.

It will be appreciated that the value of V2 may be zero in some conditions.

The system of FIG. 2 may be modified to detect more than two substances if desired. Thus, for example, a third substance, having a greater half-life than copper, can be detected by using a third radiation detector which would be connected to the output 15 via a further delay volume selected according to the principles explained above so that the total delay volume for the third radiation detector was such as to give maximum activity, for the system flow rate, in this third detector. It will be appreciated, of course, that the delay volumes required may become impractical if there is a very large difference in the half-lives of the different substances to be detected.

It is to be understood that copper and phosphorus are merely exemplary of many different substances which can be detected by the system: for detecting other substances, the various volumes would be adjusted accordingly.

Although the various volumes shown are advantageously obtained by coiling the pipe, they may instead be obtained by passing the fluid through a tank having the appropriate volume. In some applications, however, the delay volumes V2 and V4 may be provided merely by the lengths of pipe between the coil 8 and the coil 12 and between the coil 12 and the coil 17 if these lengths of pipe are of appropriate length.

Figure 6:
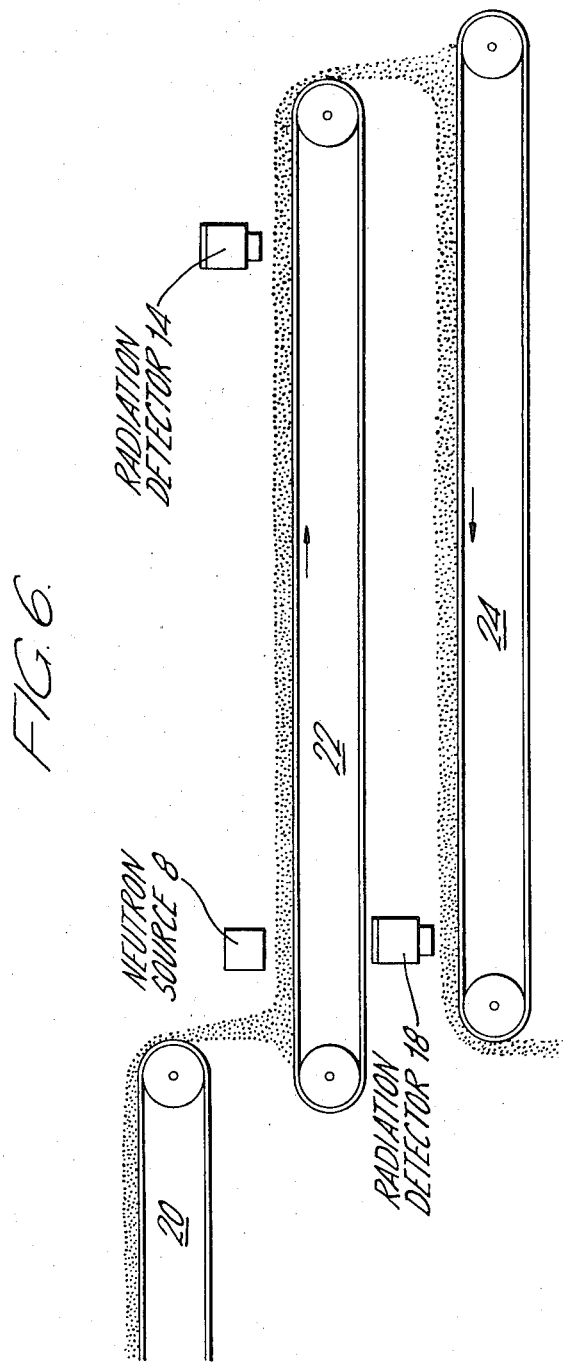
FIG. 6 is a block diagram of a modified form of the system of FIG. 2.

Although the system has been described for analysing flowing fluid samples, it may be adapted to detect substances in solid samples such as, for example, where the solids are in the form of particles or powder. In such case, a conveyor could replace the pipe 5 as shown in FIG. 6. Here, the conveyor is in three sections, a feed section 20 which feeds the particles or powder at a controlled rate on to a second section 22 which carries the material past the neutron source 8 and the radiation detector 14, and a third section 24 which receives the material from the second section 22 and carries it past the radiation detector 18. The second and third conveyor sections 22 and 24 enable the respective delay volumes between the source 8 and the detectors 14 and 18 to be adjusted by varying their respective speeds.

Suitable shielding should be provided to give protection from the hazards of the neutron generator and prevent interference between the two radiation detectors of the system of FIG. 2.

The detectors used in the system can be of any convenient type such as incorporating sodium iodide crystals for example, Geiger-Muller tubes, cherenkov counters, or $BF_3$ neutron detectors.

The neutron generator used can be of any suitable type. It may, for example, be an isotopic neutron source or a nuclear reactor; in the latter case, the coiled region 6 of the pipe would not be coiled round the outside, but would be positioned in a region of neutron flux.

What is claimed is:

1. In a method of on-line analysis of a flowing sample to detect at least one substance therein, in which the flowing sample is irradiated at a first location in its flow path, and in which the radiation produced is detected at a second location in the flow path, downstream of the first location, the improvement comprising
    the step of adjusting the flow rate of the sample along the flow path in dependence on the volume of the sample in the part of the flow path between the first and second locations to produce maximum radiation activity for the said substance at the second location, and
    analyzing the radiation activity detected at the second location.

2. A method according to claim 1 and for simultaneously detecting a second substance having a different half-life from the first-mentioned substance, including the steps of detecting the radiation produced at a third location in the flow path, downstream of the second location, and
    adjusting the flow rate of the sample along the flow path, in relation to the respective volumes of the sample in the part of the flow path between the first location and the second location and in the part of the flow path between the first location and the third location, and in relation to the respective half-lives of the two substances, until the radiation activity for the first-mentioned substance is a maximum at the second location, and the radiation activity for the second substance is a maximum at the third location.

3. A method according to claim 2, including the steps of establishing a first calibration curve relating activity of the first-mentioned substance and flow rate for different values of the delay volume in between the first and second locations, selecting the said flow rate by reference to the said first calibration curve, so as to give maximum activity for the first-mentioned substance at the second location, deriving a constant of proportionality from the known relationship between flow rate for maximum activity and the half-life of a substance, using the value of the selected flow rate and the known half-life of the first-mentioned substance, deriving a theoretical flow rate required to give maximum activity to the second substance, using the said constant of proportionality and the known half-life of the second substance establishing a second calibration curve relating flow rate for maximum activity and delay volume between irradiating and detecting locations, deriving a required delay volume using the said theoretical flow rate and the said second calibration curve, and adjusting the delay volume between the second and third locations until the total delay volume between the first and third locations is equal to the said required delay volume.

4. A method of on-line analysis of a flowing sample to detect at least two substances therein having different half-lives, comprising the steps of irradiating the sample with neutrons at a first location in the flow path, detecting the radiation emitted by the sample at second and third locations in the flow path one of which two locations is downstream of the other and both of which are downstream of the first location, adjusting the respective volumes of the sample in the part of the flow path between the first location and the second location and in the part of the flow path between the first location and third location in relation to the respective half-lives of the two substances until the flow rate of the sample along the flow path is such that the radiation activity for the first substance is a maximum at the second location, and the radiation activity for the second substance is a maximum at the third location, and analyzing the radiation detected at the second and third locations.

5. In a method of on-line analysis of a flowing sample to detect at least two substances therein having respectively different half-lives, in which the flowing sample is irradiated with neutrons at a first location in its flow path, and in which the radiation from the sample is detected at a second location in the flow path, downstream of the first location, the improvement comprising increasing the flow rate of the sample along the flow path until the radiation activity produced by each substance is substantially independent of the flow rate.

* * * * *